(12) United States Patent
Deng et al.

(10) Patent No.: US 11,942,791 B2
(45) Date of Patent: Mar. 26, 2024

(54) SELF-POWERED WIRELESS KEYBOARD

(71) Applicant: BEIJING INSTITUTE OF TECHNOLOGY, Beijing (CN)

(72) Inventors: Fang Deng, Beijing (CN); Yanxin Ji, Beijing (CN); Xinyu Fan, Beijing (CN); Yeyun Cai, Beijing (CN); Chengwei Mi, Beijing (CN); Feng Gao, Beijing (CN); Jie Chen, Beijing (CN); Lihua Dou, Beijing (CN)

(73) Assignee: Beijing Institute of Technology, Beijing (CN)

( * ) Notice: Subject to any disclaimer, the term of this patent is extended or adjusted under 35 U.S.C. 154(b) by 74 days.

(21) Appl. No.: 17/485,485

(22) Filed: Sep. 26, 2021

(65) Prior Publication Data
US 2022/0115906 A1 Apr. 14, 2022

Related U.S. Application Data

(63) Continuation of application No. PCT/CN2019/000184, filed on Sep. 18, 2019.

(30) Foreign Application Priority Data

Mar. 29, 2019 (CN) .......................... 201910248100.9

(51) Int. Cl.
| | |
|---|---|
| *H02J 50/00* | (2016.01) |
| *G06F 3/02* | (2006.01) |
| *G06F 3/023* | (2006.01) |
| *H02J 7/00* | (2006.01) |
| *H02J 7/35* | (2006.01) |

(Continued)

(52) U.S. Cl.
CPC .......... *H02J 50/001* (2020.01); *G06F 3/0202* (2013.01); *G06F 3/0231* (2013.01); *H02J 7/0013* (2013.01); *H02J 7/35* (2013.01); *H02J 50/005* (2020.01); *H02J 50/10* (2016.02); *H02J 50/402* (2020.01); *H02J 2207/20* (2020.01); *H02J 2300/24* (2020.01)

(58) Field of Classification Search
CPC .............. H02J 50/00; H02J 50/10; G06F 3/00
See application file for complete search history.

(56) References Cited

U.S. PATENT DOCUMENTS 8,446,122 B2 * 5/2013 Wang ..................... G06F 3/0219
320/101

FOREIGN PATENT DOCUMENTS

| CN | 101105716 A | * | 1/2008 | |
| CN | 109491517 A | * | 3/2019 | ........... G06F 3/0231 |
| JP | 2012244114 A | * | 12/2012 | |

* cited by examiner

*Primary Examiner* — Rexford N Barnie
*Assistant Examiner* — Joseph N Inge
(74) *Attorney, Agent, or Firm* — Yong Chen

(57) ABSTRACT

A self-powered wireless keyboard by modifying the structure of a traditional membrane keyboard having a volcanic crater structure. Not damaging the original membrane keyboard structure, a micro magnet core is installed inside a cylindrical protrusion block under the key cap as a mover of the induction power generation device, and an induction coil is wound in a key slot of the keyboard base as the stator of the induction power generation device. In this way, when each key is pressed, it will produce induction current. A layer of flexible solar cell can be laid on the upper surface of the key, which can generate electricity by collecting the light energy in the surrounding environment during the time of daily illumination.

5 Claims, 2 Drawing Sheets

(51) Int. Cl.
*H02J 50/10* (2016.01)
*H02J 50/40* (2016.01)

SELF-POWERED WIRELESS KEYBOARD

FIELD

The invention belongs to the technical field of wireless keyboards, in particular to a self-powered wireless keyboard.

BACKGROUND

Conventional keyboards need wired connection and their use is limited by the wire, which also makes the desktop messy. A wireless keyboard is generally connected to the computer through wireless Bluetooth, which can go beyond the limitations of traditional keyboards. However, a wireless keyboard needs to be provided with batteries. In this case, most manufacturers need to delete some functions of the keyboard in consideration of the battery life. Therefore, compared with conventional keyboards, wireless keyboards lost some advantages which limited their spread and use. Therefore, we designed a self-powered wireless keyboard combining mechanical energy and solar energy, which can improve the wireless keyboard's endurance, and can expand the function of wireless keyboard and enhance user experience. At present, there are some limitations in the existing self-powered wireless keyboards:

(1) Extra work is required. For example, CN204965349 (A wireless keyboard with power generation by hand, by Shangyin Long et al.) proposes a wireless keyboard with power generation by hand, which can generate electricity and supply power to a wireless keyboard by shaking a hand rocker. However, the invention in this application can only realize the energy supply through the active work of human body. It does not fully utilize the energy generated in the use of the keyboard or energy from the environment, and is inconvenient to use.

(2) The utilization efficiency of mechanical energy generated by pressing keyboard is low. For example, CN 106225811A (A keyboard capable of generating electricity, by Xianying Wang, pengfan Xie, Xuejun Zheng, etc.) proposes a kind of keyboard device using ZnO nanowires to generate electricity by piezoelectric effect, which transforms mechanical energy into electrical energy and utilizes the energy lost by the user while working. However, piezoelectric effect has a very low energy utilization efficiency when a key is pressed. Generally, the key stroke range of a membrane keyboard is between 2.50 mm and 4.50 mm, and the deformation utilized by piezoelectric effect is far less than this range.

(3) The energy generated by mechanical energy is weak. For example, CN 101105716 A (A keyboard with power generation device, by Deqiang Jing) proposes a keyboard which can generate induced current by pressing keys on the keyboard. But the key design of the device has great changes compared with the common keyboard. Its implementation is relatively complicated. The power generation efficiency is very low and cannot meet the demands for a keyboard for normal use.

SUMMARY

In view of the above, an object of the invention is to provide a self-powered wireless keyboard, which can be simply modified based on an original keyboard to realize self energy supply.

A self-powered wireless keyboard includes a permanent magnet core, an induction coil and a power management module.

The permanent magnet core is arranged inside a protrusion block on the lower surface of the key, and the induction coil is wound around within the key slot under the keyboard.

The power management module can receive the induced current generated by the induction coil and supply power for the wireless keyboard.

Preferably, the power management module includes a battery. The power management module converts the voltage of induced current into a voltage required by the battery and supplies power to the battery. The battery stores power and supplies power to the wireless keyboard.

Preferably, the induced current generated by each induction coil is fed into the power management module through a wire laid on the bottom of the keyboard.

Preferably, the induction coils are connected in parallel by conducting wires.

Further, the upper surface of the key is covered by solar cell film, and the current produced is sent to the power management module.

Further, there are two spiral coils on the lower surface of each key. The upper ends of the two spiral coils are respectively connected with the positive and negative poles of the solar cell film, and the lower ends are connected with power management module.

Preferably, the solar cell film on each vertical row of keys on the keyboard is connected in series by wires into a battery group; the battery groups each are connected in parallel by wires, and finally the generated current is sent to the power management module.

The beneficial effects of the invention are as follows:

The invention modifies a traditional membrane keyboard having a "volcanic crater" structure. While not damaging the original keyboard structure, a micro magnet is installed inside the cylinder block of the key cap, which is used as a mover for the induction power generation device. An induction coil is wound within the key slot in the keyboard base as the stator of the device. In this manner, each key will generate an induced current when pressed. The design can reduce the cost while ensuring the function and efficiency through limited modification the original keyboard structure.

A layer of flexible solar cell on the surface of the key can generate electricity by collecting the light energy in the surrounding environment during the time of daily illumination, and can realize the continuous charging of the wireless keyboard battery at any time and any place under the illumination.

The solar cell of each key is organized through certain series and parallel connections, which can increase the voltage, and increase the current by parallel connection of battery groups, and reduce the internal loss of the circuit as much as possible.

The electric energy of the solar cell is transmitted through the spiral coil, which can adapt to the key stroke without adding additional work load to the key, and can extend the service life.

In which: 1-1—solar cell thin film, 1-2—spiral coil, 2-1—key, 2-2—rubber films, 3-1—permanent magnet core, 3-2—induction coil, 4—solar array positive pole, 5—solar array negative pole.

DETAILED DESCRIPTION OF THE EMBODIMENTS

The invention will be described in detail with reference to the accompanying drawings and examples.

The invention provides a self-powered wireless keyboard. In the original structure of key (2-1) of the keyboard, a mechanical energy induction power generation device composed of a magnetic core mover and a coil stator and a flexible solar panel power generator are installed. The power generating units are combined into an array by appropriate series and/or parallel connection to ensure the power generation voltage while reducing the internal loss of power as much as possible. A power management module controls the DC-DC conversion circuit by MPPT algorithm to store the generated electric energy in the battery and supplies it to the wireless keyboard.

Figure 1:
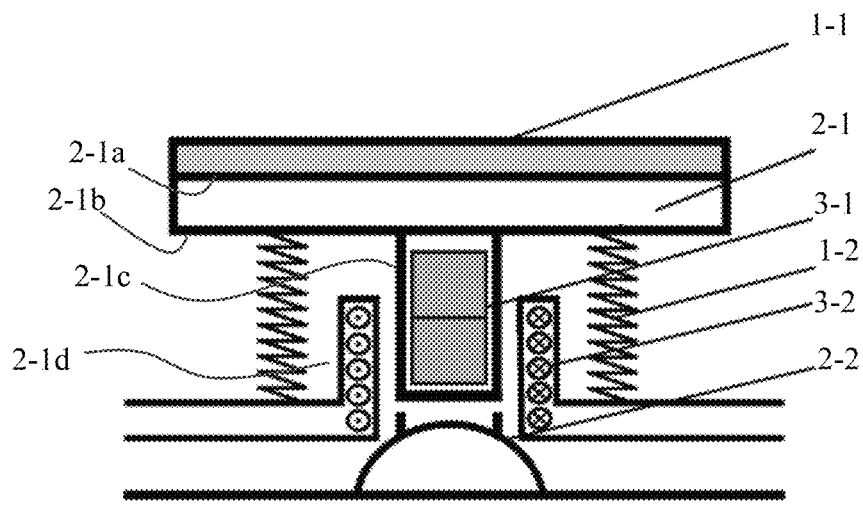
FIG. 1 is a structural diagram of a key of the invention.

In FIG. 1, a key (2-1) of a membrane keyboard based on a volcanic crater structure has a circular protrusion block (2-1c) on the lower surface of the key (2-1b). A rubber film (2-2) which provides rebound for the key (2-1) is arranged in the middle of the key (2-1) facing the circular protrusion block. A permanent magnet core (3-1) and induction coil (3-2) are added on the original membrane keyboard. The micro permanent magnet core (3-1) is enclosed in a cylindrical protrusion block as the mover of the induction power generation device, and an induction coil (3-2) is wound around the bottom of the key slot (2-1d) under each key in the keyboard base as the coil stator of the induction power generation device. After the key (2-1) is pressed, according to the electromagnetic induction principle, the induction coil (3-2) will produce a certain amount of induction current. For a larger key having multiple circular protrusion block on the lower surface, an induction generator structure can be installed for each protrusion block to make full use of the space of the keyboard to increase the power output. This design only modifies the original keyboard structure to a limited extent, and reduces the cost as far as possible while ensuring the function and the efficiency.

The upper surface (2-1a) of key (2-1) is laid with a flexible solar cell panel (1-1). The solar cell here is flexible because regular solid solar cells are fragile and not suitable for such application scenarios as keyboard. The electric energy generated by the solar panel (1-1) is input into the connecting circuit under the base through the spiral coil (1-2) under the key (2-1). The design of the spiral coil (1-2) accommodates the travel during the strokes of the key (2-1). So it does not add additional work load to the key (2-1) and has a longer service life.

Figure 2:
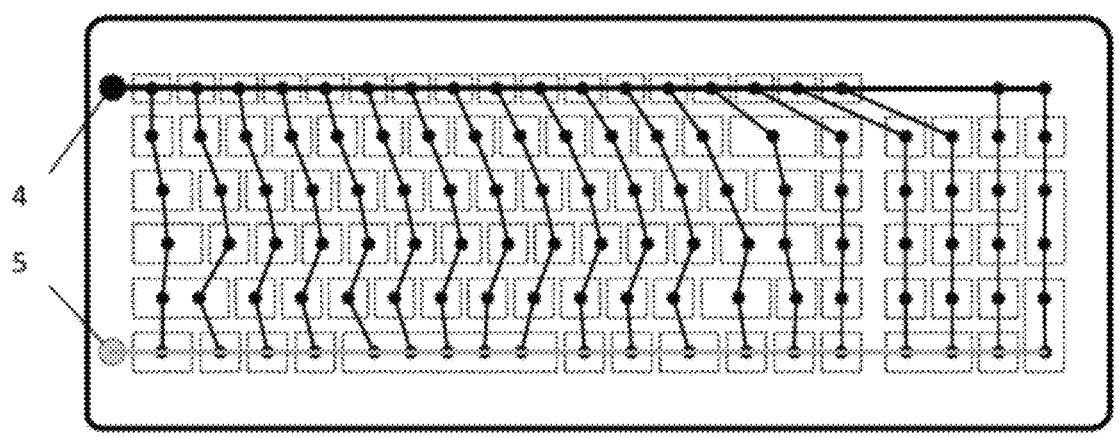
FIG. 2 is a connection diagram of the flexible solar array of the invention.

Usually the mechanical energy of pressing a key (2-1) can generate alternating current energy for one key at a time. In order to reduce the power loss, all induction coils (3-2) for multiple keys are connected to a back-end processing circuit in parallel. As shown in FIG. 2, the connection of solar panel (1-1) uses a combination of series connection and parallel connection. The series connection of solar panel can increase the output voltage, but the current may mismatch (the current will be different due to the uneven illumination). So that the series current can be equal to the smallest current of all the solar panels connected in series, and the excess current will be consumed between the panels (equivalent to the load). This will not only cause the loss of electric energy, but also increase the heating of the solar panels, which will affect the life of the system. The parallel connection of the solar panels can increase the output current, and the effect of mismatch in the system is smaller than that of the series connection. When a user uses the keyboard, the user's hand will block the light, and the vertical series connection is relatively less affected than the horizontal series connection. While in the process of boosting voltage through DC-DC circuit, the greater the difference between input and output voltage, the greater the loss.

So it is necessary to increase the voltage through series connection. In view of these considerations, a group of 6 vertically arranged keys (2-1) are selected for series connection to increase the voltage, and these solar panels are then connected in parallel (the two ends of the parallel connection are respectively connected to the power management module through the positive (4) and negative (5) of the solar array) to increase the current, and reduce the internal loss of the circuit as much as possible.

Figure 3:
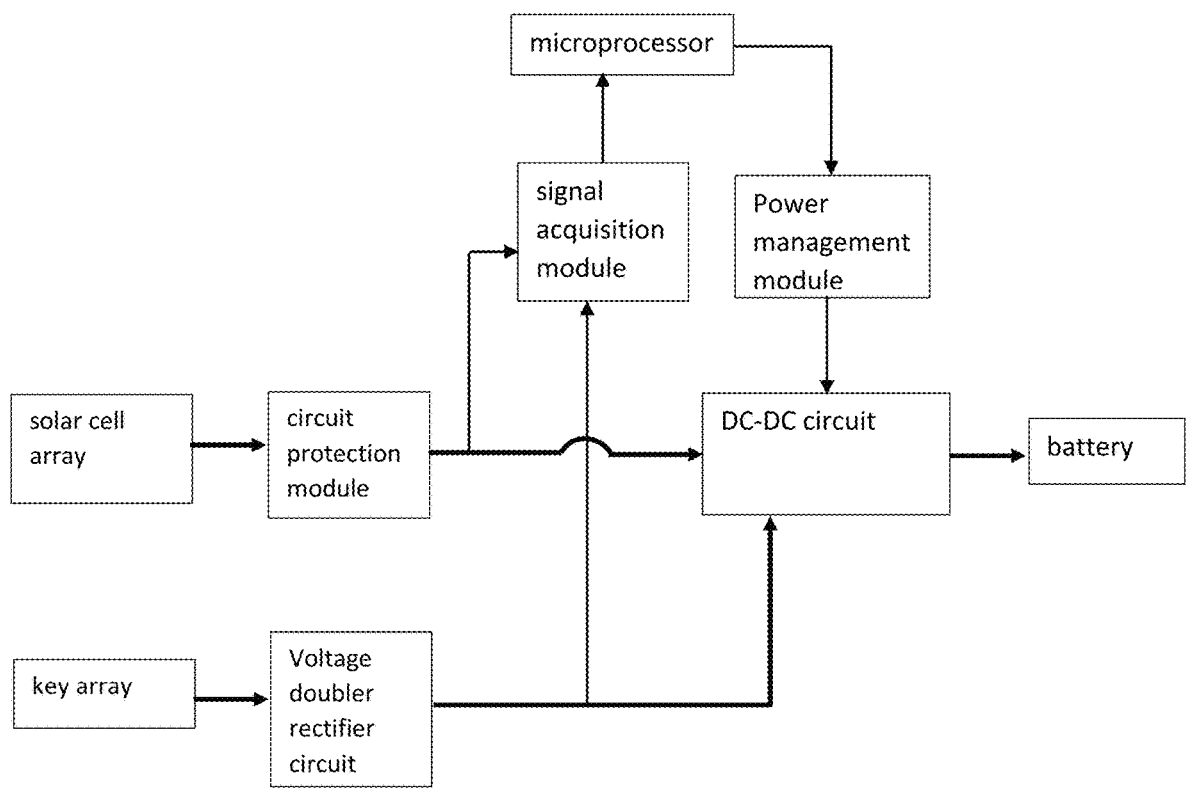
FIG. 3 is a system structural diagram of the invention.

As shown in FIG. 3, which shows an overall structure diagram of the system, the output of solar cell array is connected to the circuit protection module connected with the power management module to protect the system from the damage of a surge voltage. The induction coils (3-2) are connected in parallel, and the alternating current is converted into direct current through the voltage doubling rectifier circuit (more efficient and less lossy than a half wave rectifier circuit and the full bridge rectifier circuit). After preliminary processing, the electric energy will be converted to the charging voltage required by the battery through the DC-DC circuit. In order to improve the output efficiency of electric energy, a microprocessor is used to sample the voltage and current signals of solar cells and induction coils respectively. MPPT algorithm is applied to obtain and track the maximum power point of electric energy generated by the circuit. The power management module (PWM module) is used to control the DC-DC circuit, so that the electric energy output works at the maximum power point.

The invention utilizes the mechanical energy generated by pressing keys of the keyboard and the light energy in the environment. The generated energy can substantially meet the energy consumption requirement of a wireless keyboard and realize self energy supply for the wireless keyboard.

To sum up, the above embodiments are only preferred embodiments of the invention, and are not meant to limit the protection scope of the invention. Any modification, equivalent substitutions and improvements and the like within the principle and spirit of the invention are encompassed in the protection scope of the invention.

The invention claimed is:

1. A self-powered wireless keyboard, comprising:
   a plurality of key units, each unit including:
      a key having a lower surface and a protrusion block extending from the lower surface;
      a key slot underneath the lower surface of the key and around the protrusion block;
      a permanent magnet core arranged inside the protrusion block; and
      an induction coil wound around the protrusion block and within the key slot, and
   a power management module configured to receive induced current generated by the induction coil of each of the key units and supply power for the wireless keyboard;

where the key of each of the key units has an upper surface provided with a solar cell film, and generated current by the solar cell film is sent to the power management module;

and wherein the lower surface of the key of each of the plurality of key units is provided with two spiral coils each having an upper end and a lower end, the upper ends of the two spiral coils being respectively connected with positive and negative poles of the solar cell film, and the lower ends are connected with the power management module.

2. The self-powered wireless keyboard of claim 1, further comprising a battery, wherein the power management module converts the received induced current into a voltage required by the battery and supplies power to the battery, and wherein the battery stores electric energy and supplies power to the wireless keyboard.

3. The self-powered wireless keyboard according to claim 1, wherein the induced current generated by the induction coil of each of the key units is sent to the power management module through a wire laid on the bottom of the keyboard.

4. The self-powered wireless keyboard according to claim 1, wherein the induction coils of the plurality of key units are connected in parallel.

5. The self-powered wireless keyboard according to claim 1, wherein the solar cell film on the key of each vertical row of keys of the keyboard are connected in series into a battery group, and multiple battery groups are connected in parallel.

* * * * *